United States Patent [19]

van der Lely

[11] 4,249,614
[45] Feb. 10, 1981

[54] IMPLEMENT

[76] Inventor: Cornelis van der Lely, 7, Brüschenrain, Zug, Switzerland

[21] Appl. No.: 902,034

[22] Filed: May 2, 1978

[30] Foreign Application Priority Data

May 4, 1977 [NL] Netherlands ............... 7704892

[51] Int. Cl.³ .................. A01B 13/08; A01B 61/04
[52] U.S. Cl. ................... 172/261; 172/699; 188/316
[58] Field of Search ............ 172/261, 262, 263, 264, 172/265; 188/311, 316, 314, 297, 318, 313; 267/34; 305/10

[56] References Cited

U.S. PATENT DOCUMENTS

| 2,228,865 | 1/1941 | Bird | 172/261 |
|---|---|---|---|
| 3,321,031 | 5/1967 | Evans | 172/261 X |
| 3,376,958 | 4/1968 | Carr | 188/316 |
| 3,539,229 | 11/1970 | Scully | 267/34 X |
| 3,642,074 | 2/1972 | Geurts | 172/265 |
| 3,733,107 | 5/1973 | Cote | 305/10 |
| 3,752,092 | 8/1973 | Vinyard | 172/677 |
| 3,760,882 | 9/1973 | Geurts | 172/265 |
| 3,929,057 | 12/1975 | Kondo | 188/300 |

Primary Examiner—Richard J. Johnson
Attorney, Agent, or Firm—William B. Mason

[57] ABSTRACT

An implement has subsoil tines interconnected to a beam of the frame. At least one of the tines has an upper fastening portion pivoted to a beam of the frame. An overload device also interconnects the fastening portion to the beam so that upon overload on the tine, the device can trip and release the tine for pivotal movement, out of operative position to avoid damage. The device is a hydraulic circuit in which a piston in a cylinder holds the tine in place. A relief valve in the circuit allows escape of fluid from one side of the piston to a reservoir so that the piston and cylinder can move relative to each other upon overload. A spring, either within the cylinder or otherwise associated with the piston, biases the tine to return in operative position. A part of the circuit has a further valve that permits fluid return. The relief valve is held by a spring and screw knob to vary overload pressure of the fluid.

13 Claims, 5 Drawing Figures

IMPLEMENT

According to a first aspect of the present invention there is provided an implement comprising a frame and an operative portion mounted on the frame, the operative portion, in normal operation, being rigidly connected to the frame in an operative position by locking means which, upon overload of the operative portion, permits displacement of the operative member relative to the frame, return means being provided for returning the operative portion to the operative position after overload.

According to a second aspect of the present invention, there is provided an implement comprising a frame and an operative portion mounted on the frame, the operative portion, in normal operation, being rigidly connected to the frame in an operative position by locking means which, upon overload of the operative portion, permits displacement of the operative member relative to the frame, a resilient element being provided for returning the operative portion to the operative position after overload, the resilient element being substantially horizontal in normal operation.

According to a third aspect of the present invention there is provided an implement comprising a frame and an operative portion mounted on the frame, the operative portion, in normal operation, being rigidly connected to the frame in an operative position by locking means which, upon overload of the operative portion, permits displacement of the operative portion relative to the frame, a resilient element being provided for returning the operative portion to the operative position after overload, this resilient element extending in the intended direction of operative travel of the implement and being located above a frame beam of the frame when the operative portion is in the operative position.

According to a fourth aspect of the present invention there is provided an implement comprising a frame and an operative portion mounted on the frame, the operative portion, in normal operation, being rigidly connected to the frame in an operative position by locking means which, upon overload of the operative portion, permits displacement of the operative portion relative to the frame, the locking means comprising a cylinder in which a resilient element is mounted, the cylinder being pivotally connected with the operative portion.

According to a fifth aspect of the present invention there is provided an implement comprising a frame and an operative portion mounted on the frame, the operative portion, in normal operation, being rigidly connected to the frame in an operative position by locking means which, upon overload of the operative portion, permits displacement of the operative portion relative to the frame, the locking means comprising a cylinder, in normal operation, containing fluid under pressure, there being provided a pressure relief valve which determines a limit value of the pressure of the fluid at which unlocking occurs.

For a better understanding of the present invention and to show how it may be carried into effect, reference will now be made, by way of example only, to the accompanying drawings, in which FIG. 1 is a horizontal side elevational view of an agricultural implement attached to the three-point lifting device of a tractor;

Figure 1:
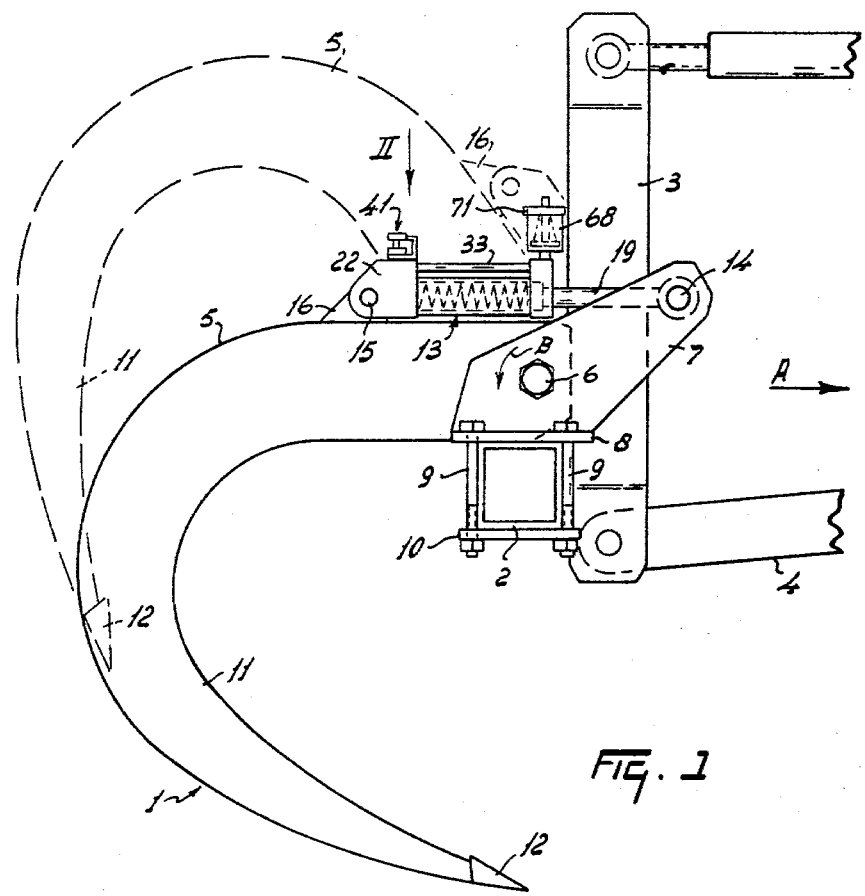

The agricultural implement shown in FIG. 1 is a chisel plow comprising at least one, but preferably several, operative portions in the form of soil working tines 1 mounted on the top of a substantially horizontal hollow frame beam 2 which extends transversely of the intended direction of operative travel of the plow, which is indicated by an arrow A. The frame beam 2 is connected at the front with a three-point trestle 3. The three-point trestle 3, as shown, is coupled with the arms of a three-point lifting device 4 of an agricultural tractor (not shown).

Figure 2:
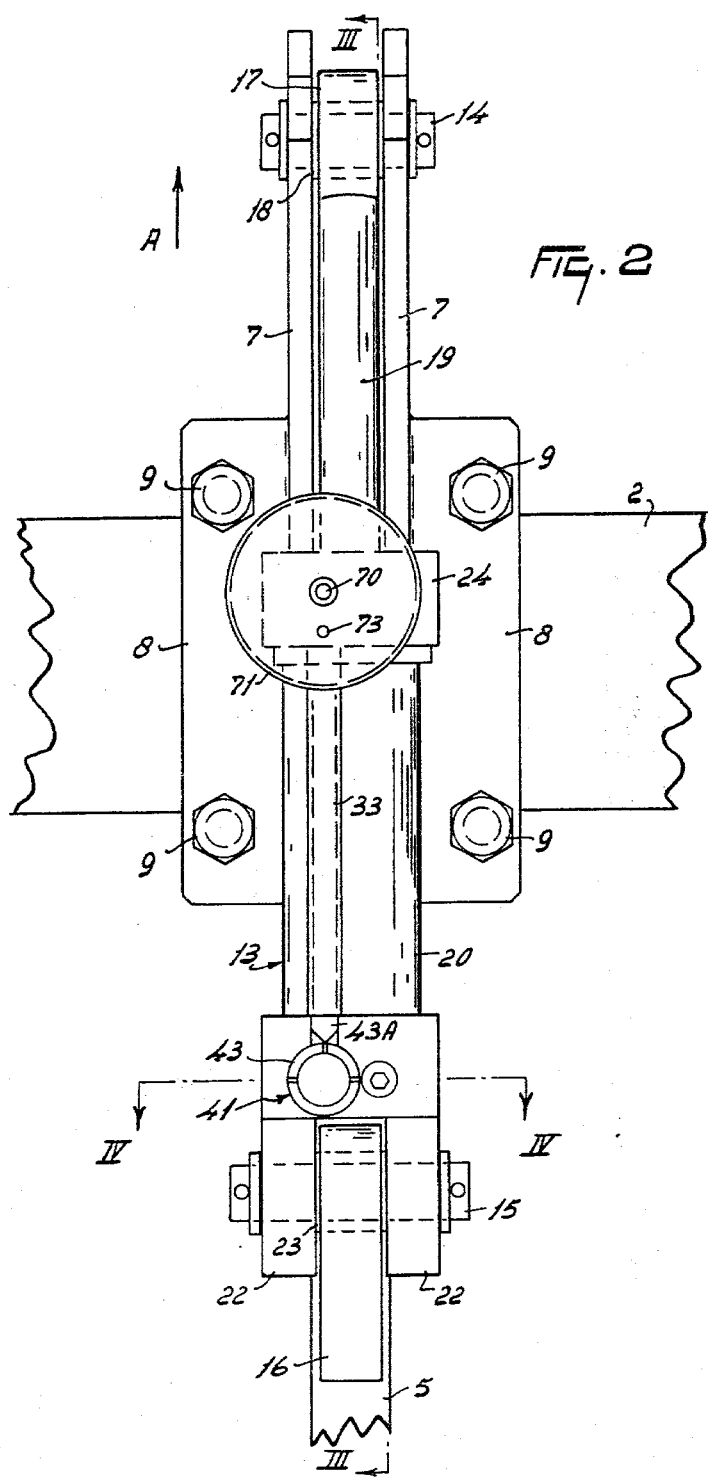
FIG. 2 is an enlarged plan view of part of the implement in the direction of the arrow II in FIG. 1.
Figure 3:
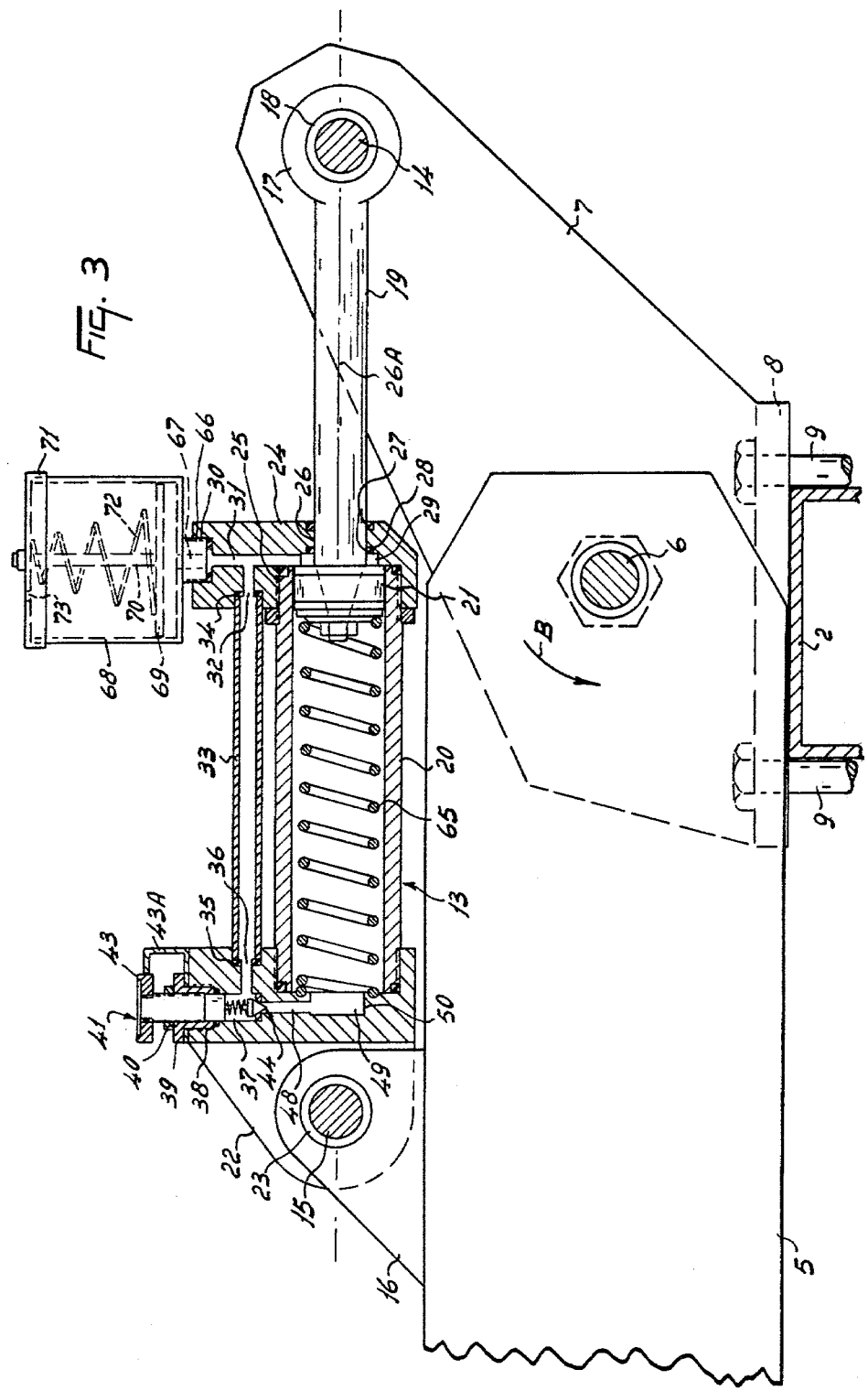
FIG. 3 is a partly sectional elevational view taken on the line III—III in FIG. 2.

Referring to FIGS. 2 and 3, the tine 1 has a shank or fastening portion 5 which is pivotally mounted on a stub shaft 6. The fastening portion 5, which in this embodiment, is a flat part, is located between two lugs 7 which extend substantially parallel to the fastening portion 5 one on each side, (see FIG. 2). The stub shaft 6 is supported on both sides of the portion 5 in openings in the lugs 7. Near their lower edges, the lugs 7 have outwardly directed flanges 8, which are substantially horizontal and are rigidly secured to the beam 2 by tensile bolts 9, one on each side of the beam 2, and clamping plates 10. The lugs 7 extend from the top of the beam 2 upwardly and in the direction A to a location in front of the three-point trestle 3.

The tine 1 comprises a curved portion 11 extending from the fastening portion 5 and tapering so as to terminate in a tip 12. The free end of the tip 12 is in this embodiment, located substantially in a vertical plane extending transversely of the direction A and containing the pivotal axis of the stub shaft 6.

At the top edge of the fastening portion 5 there is locking means 13, which at least in normal operation, rigidly connects the frame formed by the beam 2 with the cultivator tine 1. The locking means 13 is pivotally arranged between a stub shaft 14 located at the front of the lugs 7, and a stub shaft 15 which is journalled in a tag 16 on the top of the fastening portion. The stub shafts 14 and 15 are parallel to the stub shaft 6. The plane containing the pivotal axes afforded by the stub shafts 14 and 15 is substantially horizontal when the plow is in the operative state as shown in FIG. 1.

Figure 4:
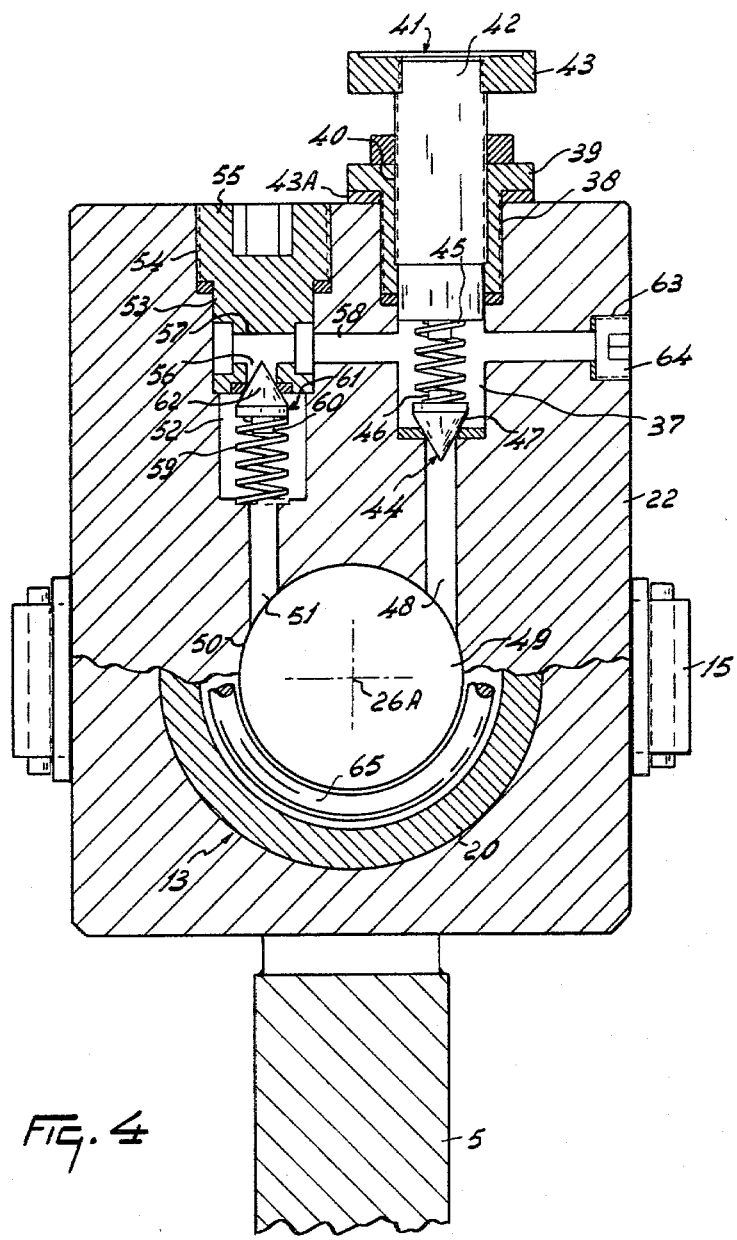
FIG. 4 is an enlarged partly sectional elevational view taken on the line IV—IV in FIG. 2.

The locking means 13 is connected with the stub shaft 14 by means of an eyelet 17 having a bearing 18 for the stub shaft 14. The eyelet 17 is on a piston rod 19 which extends into a cylinder 20 and is connected with a piston 21 which is slidable in the cylinder 20. The cylinder 20 extends in the direction A and is provided at the rear with a forked end portion 22, the limbs of which hold a bearing 23 surrounding the stubs shaft 15. At the end away from the end portion 22, the cylinder 20 has an end portion 24, which is screwed onto the end of the cylinder 20 (FIG. 3). The end portion 24 guides the piston rod 19 in a bore 26, the centerline 26A of which coincides with the centerline of the cylinder 20. The bore 26 is provided at each end with seals 27 surrounding the piston rod 19. The end portion 24 also has a cylindrical recess 28, the centerline of which coincides with the centerline 26A of the bore 26. The diameter of the recess 28 is slightly smaller than the internal diameter of the cylinder 20. The end wall of the recess 28 is perpendicular to the centerline 26A and is located behind the parallel end wall of the cylinder 20 to form a space 29. The space 29 is bounded by the face of the piston 21 and the outer surface of the piston rod 19. The outer surface of the end portion 24 has a tapped bore 30. In the direction towards the centerline 26A the bore 30 is extended by a coaxial bore 31; these bores 30 and 31 are perpendicular to the centerline 26A. The bore 31 opens into the space 29. The bore 31 communicates through a bore 32 which is parallel to the centerline 26A with a conduit 33. The conduit 33 extends parallel to the centerline 26A and is in liquid-tight relationship with the end portion 24. The conduit 33 is connected at its end away from the end portion 24 by means of a seal 35 in a liquid-tight manner with the end portion 22 and communicates with a bore 36 in the end portion 22, which is also parallel to the centerline 26A. The bore 36 opens into a bore 37, which is perpendicular to the centerline 26A. The outer surface of the end portion 22 has a tapped bore 38 which communicates with the bore 37 and is parallel to the bore 37. The bore 37 receives a guide member 39 having an external screwthread co-operating with the internal screwthread of the bore 38 (see FIG. 4). The guide member 39 has an uninterrupted tapped hole 40. The hole 40 receives a set screw 41, the shank 42 of which has an external screwthread co-operating with the screwthread of the hole 40. The set screw 41 comprises an adjusting ring 43 provided with a dial for indicating the setting of a limit value of the fluid pressure or a force at which a valve 44 to be described more fully hereinafter opens. The adjusting ring 43 is adjustable with respect to an indicator 43A secured rigidly to the end portion 22. The bore 37 accommodates a compression spring 45, one end of which bears on a projecting part of the shank 42, the other end surrounding and holding a stem 46 of the adjustable pressure relief valve 44. The valve 44 has a conical end 47, which, in normal operation, engages the transitional region between the bore 37 and a bore 48 communicating therewith, the conical end 47 separating the bores. The bore 48 opens into a chamber 49 afforded by a recess 50 in the end portion 22, the centerline of which coincides with the centerline 26A. The recess 50 has a cylindrical wall and a wall which is perpendicular to the centerline 26A, which is located some distance behind the parallel end face of the cylinder 20. A bore 51 also opens into the chamber 49 and it is parallel to the bore 48. The bore 51 communicates with a bore 52, which again communicates with a bore 53. The outer surface of the end portion 22 has a further tapped bore 54 communicating with the bore 53. The bores 51, 52, 53 and 54 are coaxial and perpendicular to the centerline 26A. The bore 54 contains a plug 55 having an external screwthread co-operating with the screwthread of the bore 54.

The plug 55 has a bore 56 which is coaxial with the bore 51, this bore 56 communicating with the bore 52. The plug 55 has a further bore 57, which is perpendicular to the centerline 26A. The bore 57 communicates with a bore 58 in the end portion 22, which is coaxial wih the bore 57 and which communicates with the bore 37. The bore 52 accommodates a compression spring 59, one end of which bears on a boundary wall between the bores 51 and 52, the other end surrounding and holding a stem 60 of a non-return valve 61. The valve 61 has a conical valve member 62 which, in normal operation, engages the interface between the bores 52 and 56, these bores being thus separated from one another. The bore 58 communicates with a hole 63 in the outer wall of the end portion 22, into which is screwed a sealing plug 64.

The chamber 49 communicates with a space 20A in the cylinder 20 on the side of the piston 21 facing an end portion 22. The space 20A holds a resilient element in the form of a compression spring 65 which does not touch the inner surface of the cylinder and which presses the piston 21 and the piston rod 19 away from the end portion 22.

FIG. 3 shows that the bore 30 contains a guide member 66 having a screwthread co-operating with the screwthread of the bore 30. This guide member has a bore 67, which is coaxial with the bore 30. The bore 67 opens into a reservoir 68 arranged on the top of the end portion 24. In the reservoir 68 there is a piston 69 which is a close fit with the inner wall of the reservoir 68. The piston 69 has a guide rod 70 which passes out of the reservoir 68 through an opening in a cover 71. Between the inner side of the cover 71 and the top of the piston 69 acts a light compression spring 72. The cover 71 has an opening 73 establishing a communication between the interior of the reservoir 68 above the piston 69 and the open air.

There is hydraulic fluid in the hydraulic circuit including the interior of the cylinder 20 and the space 29, the bore 31 and the bore 32, the conduit 33, the bores 36, 37, 48, the chamber 49, the bores 51, 52, 56, 57, 58 and 67 and the interior of the reservoir 68 below the piston 69. The bores 51, 52, 56, 57, 58 constitute a by-pass of the bores 37 and 48.

In normal operation the eyelet 17 is mounted by the bearing 18 on the stub shaft 14 and the limbs of the forked end portions 22 are fitted to the stub shaft 15 by the bearing 23. In normal operation, the compression spring 45 presses the conical end 47 of the valve 44 into the entry of the bore 48 with a force which can be adjusted by the adjusting ring 43. Adjustment of the adjusting ring or knob 43 results in axial displacement of the shank 42 owing to the threaded engagement of the two parts.

From the position shown in FIG. 3 of the piston 21 in the cylinder 20, the piston 21 and the piston rod 19 can be urged towards the end portion 22 if such a great force is exerted on the operative portion constituted by the tine 1, that some means for safeguarding against overload is desirable. The locking means 13 constitutes such a means. If the piston 21 is urged towards the end portion 22 by a force near the adjusted limit value of the valve 44, the fluid pressure in the space 20A as well as the fluid pressure in the bores 50 and 48 will attain a high value. When the limit value set by the valve 44 is reached, the fluid pressure on the valve 44 will lift it against the pressure of the spring 45 so that the fluid flows from the chamber 49 to the space around the piston rod 19 on the other side of the piston 21 through the bore 48, the bores 37, 36, the conduit 33, the bores 32, 31 and the space 29 so that unlocking of the locking means occurs and the piston 21 can move towards the end portion 22. Since the volume of the piston rod 19 inside the cylinder 20 increases when the piston 21 moves towards the end portion 22 (since the piston rod 19 projects only from one end of the cylinder 20), a quantity of hydraulic fluid corresponding to the extra volume of the piston rod 19 has to be discharged. When the valve 44 is lifted in the event of overload, some hydraulic fluid will flow through the conduit 33 to the reservoir 68 to lift the piston 69 against the relatively light pressure of the spring 72. The piston 69 prevents air bubbles from getting into the hydraulic fluid in the reservoir 68. The construction described thus avoids excessive forces occurring between an operative portion and a frame which are rigidly interconnected in normal operation. The locking means described will be unlocked by excessive fluid pressure, which is solely a function of the operational force exerted on the operative portion 1. After unlocking, the spring 65 in the cylinder 20 ensures that the operative portion will turn back in the direction of the arrow B into the operative position, the fluid then flowing from the space in the cylinder around the piston rod 19 through the space 29, the bores 31 and 32, the conduit 33 the bores 36, 37, 58, 57, 56, past the non-return valve 61 towards the bores 52 and 51 so that it can flow back into the space 20A in the cylinder 20 through the chamber 49. After the tine 1 has returned into its operational position, the rigid connection between the operative portion and the frame is re-established so that the locking means can again respond via the adjustable valve 44 at an overload limit value set by the adjusting ring.

Figure 5:
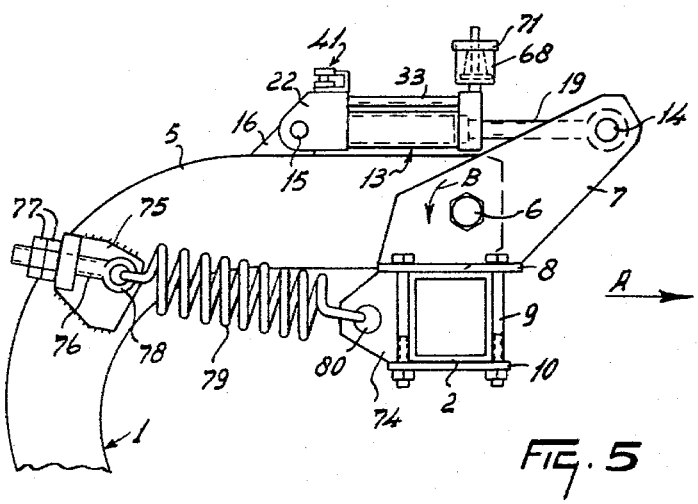
FIG. 5 is a horizontal side elevation of part of an alternative embodiment of the agricultural implement.

In the embodiment shown in FIG. 5, the compression spring 65 of the locking means is dispensed with. Parts corresponding with those of the first embodiment are designated by the same reference numerals. The rear of the beam 2 is provided with a tag 74 and the tine 1 is provided in the region between the fastening portion 5 and the curved portion 11 with an angle bracket 75. The angle bracket 75 has a bore through which passes a bolt 76 having nuts 77, which prevent the bolt from mowing towards the tag 74. The bolt 76 has an eyelet 78 on the side facing the tag 74 through which passes the end of a tension spring 79. The end of the spring 79 away from the eyelet 78 passes through a bore 80 in the tag 74.

The locking means 13 in the variant shown in FIG. 5 operates largely like the first embodiment. After the cause of overload has been eliminated the tensile spring 70 can draw the operative portion 1 back into the operational state. An advantage of this embodiment is that the spring tension can be adjusted simply by means of the bolt 76. This adjustment may be advantageous if it is desired to adjust the time required for the time to return from the upturned position shown in FIG. 1 in dashed outline back into the operational state about the pivotal axis of the stub shaft 6 in the direction of the arrow B in FIG. 1. It should be noted that it is convenient to choose the place of the stub shaft 6 so that its pivotal axis is located in the vertical plane extending transversely of the direction A and containing the free end of the tip 12. With this arrangement, in the event of overload the operative portion formed by the tine 1 turns in a direction opposite the arrow B so that the tip 12 moves upwardly without any initial downwards movement and can thus directly turn away from behind an obstacle.

It should furthermore be noted that the locking means 13 may be employed for locking an operative portion of an agricultural machine on a frame and can also be used with machinery other than agricultural machinery. It is an important advantage that the operation of the locking means as a unit associated with the operative portion 1 is performed completely independently of the hydraulic circuit of the tractor and also independently of hydraulic circuits of locking devices on neighbouring parts. The locking means 13 can be particularly effectively used for safeguarding an individual plough body against overload, while the locking system may be advantageously employed in an operative portion arranged on a frame by means of a polygonal hinge. The locking device may then be arranged in one of the arms of in the junction of the arms.

While various features of the plough that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. An implement comprising a frame and tool means rigidly interconnected in operative position with the frame by overload locking means during normal operation, said tool means being pivotably mounted on a beam of said frame and displaceable relative to said beam responsive to overload on said tool means, said locking means comprising an enclosed hydraulic circuit that includes a cylinder with a slideable piston, said piston including a rod that extends through one end of the cylinder to a pivot connection to said frame, spring means urging said piston to adjacent said one end and the tool means to operative position, the other end of said cylinder being connected to said tool means, said circuit including bore means in communication with the cylinder to one side of said piston, a by-pass conduit leading from said bore means to reservoir means in communication with said cylinder via further bore means to the other side of said piston and near said one end, a displaceable pressure relief valve in said circuit that releases fluid automatically responsive to overload above a predetermined limit pressure and allows said piston to slide within the cylinder with accompanying substantial displacement of the tool means out of operative position.

2. An implement as claimed in claim 1, in which said tool means is a C-shaped tine and said locking means is located entirely above said tine, said tine having a foremost free end located in a vertical plane that contains the pivotal axis of the connection between the tine and said beam.

3. An implement as claimed in claim 1, in which said spring means is a tensile spring and is located adjacent the cylinder.

4. An implement as claimed in claim 1, in which said tool means comprises a plurality of said working tools mounted along the length of said beam, each tool being interconnected to said beam with a respective hydraulic locking means.

5. An implement as claimed in claim 1, in which said valve is settable with adjustment means to vary the pressure required to displace said valve.

6. An implement as claimed in claim 5, in which said adjustment means includes a turnable knob that bears on said valve.

7. An implement as claimed in claim 1 in which said frame includes a three-point trestle for connection to a lift of a prime mover.

8. An implement as claimed in claim 1, in which said tool means can be returned to operative portion when the implement is raised.

9. An implement as claimed in claim 1, in which ends of said cylinder and the piston rod are connected with the tool means and said frame respectively by stub shafts and upon overload, the two stub shafts move towards one another, said tool means being pivotable about a pivotal axis which is substantially parallel to said stub shafts, said resilient element operatively interconnecting said beam to the tool means to urge the stub shafts away from one another.

10. An implement as claimed in claim 1, in which said locking means, including the piston rod and cylinder, normally extend substantially horizontally in the operative position of said tool and pivot upwardly with the tool upon overload.

11. An implement as claimed in claim 10, in which said tool means is C-shaped when viewed from aside and said cylinder is supported directly above the upper portion of said tool means.

12. An implement as claimed in claim 1, in which said relief valve is in said first mentioned bore means and the latter is in a rear end portion of said cylinder, said further bore means being in a forward end portion of the cylinder, a check valve in said circuit that permits the return of hydraulic fluid following overload.

13. An implement as claimed in claim 12, in which said spring means is a compression spring within said cylinder that bears on one side of said piston, said rod extending from the opposite piston side.

* * * * *